(12) United States Patent
Gremald

(10) Patent No.: US 12,400,214 B1
(45) Date of Patent: Aug. 26, 2025

(54) SYSTEM METHOD AND APPARATUS FOR ENHANCED GIFT CARDS

(71) Applicant: Alan Gremald, Saint Petersburg, FL (US)

(72) Inventor: Alan Gremald, Saint Petersburg, FL (US)

( * ) Notice: Subject to any disclaimer, the term of this patent is extended or adjusted under 35 U.S.C. 154(b) by 0 days.

(21) Appl. No.: 18/584,692

(22) Filed: Feb. 22, 2024

(51) Int. Cl.
*G06Q 30/00* (2023.01)
*A63F 3/06* (2006.01)
*G06Q 20/28* (2012.01)
*G06Q 20/34* (2012.01)
*G06Q 30/0207* (2023.01)

(52) U.S. Cl.
CPC ......... *G06Q 20/342* (2013.01); *A63F 3/0665* (2013.01); *G06Q 20/28* (2013.01); *G06Q 30/0212* (2013.01)

(58) Field of Classification Search
CPC .. G06Q 20/342; G06Q 20/28; G06Q 30/0212; A63F 3/0665
See application file for complete search history.

(56) References Cited

U.S. PATENT DOCUMENTS

| | | | | |
|---|---|---|---|---|
| 6,028,920 A | * | 2/2000 | Carson | G07F 17/32 379/93.13 |
| 2010/0181755 A1 | * | 7/2010 | Irwin, Jr. | G06Q 20/28 283/100 |
| 2022/0266125 A1 | | 8/2022 | Wilson | |

* cited by examiner

*Primary Examiner* — Jamara A Franklin
(74) *Attorney, Agent, or Firm* — Larson & Larson; Frank Liebenow; Justin P. Miller

(57) ABSTRACT

An enhanced gift card and system include the enhanced gift card and prizes. One of each or multiple of the prizes are pre-assigned to one of the enhanced gift cards. After a purchaser buys the enhanced gift card and either uses or gifts the enhanced gift card to someone, a test is made to see if the enhanced gift card was purchased and if this enhanced gift card is associated with a prize and, if so, the prize is awarded to the purchaser or recipient. In one embodiment, an indication of the prize is on the enhanced gift card and occluded by material that is scratched off to reveal the prize.

13 Claims, 10 Drawing Sheets

SYSTEM METHOD AND APPARATUS FOR ENHANCED GIFT CARDS

BACKGROUND OF THE INVENTION

Today, gift cards are very prolific. The concept is simple. A purchaser buys a gift card, usually for a predetermined value, and typically gives the gift card to another as a gift, for example, for a birthday or anniversary. There are several types of gift cards, some of which are single-use (e.g., pre-loaded for a certain amount of money and discarded after the money is depleted) and some are reloadable so that when the remaining money is low, value/money can be added to these gift cards. Some gift cards are proprietary, for example for a given establishment like a fast-food chain, an online retailer, a clothing store chain, a grocery store chain, etc. Some gift cards are general and are usable at many different retailers, typically offered by major credit card companies and usable anywhere such credit cards are accepted.

When the purchaser is deciding which gift card to purchase, there are several considerations. For gift cards that are tied to a given establishment, there is usually no charge or activation fees, and the purchaser pays only the card value, for example, $50.00 for a $50.00 gift card. For such, the task of determining which gift card to purchase is typically driven by which establishment the recipient of the gift card would like, though there are often many choices for the purchaser and often the purchaser is unaware of which establishment is frequented by the intended recipient.

For gift cards that are for general use (e.g., offered by major credit card companies), the decision is different. For one, there is usually an activation fee which is typically a fixed amount that the purchaser must pay over the value that is loaded onto the gift card, for example, an additional $4.95 or $9.95. As such, the decision of the purchaser is often impacted by the cost of activation and/or the brand/reputation of the company that offers the gift card. As such cards provide income to these companies both in the activation fees and percentages that the retailer pays the company when the gift card is used, there is a lot of competition and advertising to get the purchaser to buy one gift card over another.

At present, other than through marketing, the decision between one retailer-specific gift card and another retailer-specific gift card is mostly driven by the retailer and marketing. Likewise, when the activation fees are the same or similar, the decision between one generic gift card and another generic gift card is mostly driven by the provider of the gift card and marketing.

What is needed is a system that will provide an advantage to a specific gift card to drive purchases of that gift card over a competing gift card.

SUMMARY OF THE INVENTION

An enhanced gift card and system includes the enhanced gift card (physical card) and prizes. One of each of the prizes are pre-assigned (e.g., randomly) to one of the enhanced gift cards. After a purchaser buys the enhanced gift card and either uses of gifts the enhanced gift card to someone, a test is made to see if the enhanced gift card is purchased enhanced gift card is associated with a prize and, if so, the prize is awarded to the purchaser or recipient. In one embodiment, an indication of the prize is on the enhanced gift card and occluded by material that is scratched off to reveal the prize.

In general, the present invention provides an incentive for purchasing a specific gift card by way of providing the recipient of that gift card a chance to win a prize. In such, the purchaser of the gift card will feel or believe that receiving the gift card will be more fun for the recipient if the recipient knows that they have a chance of winning something above the value of the gift card. In such, the winnings are anything tangible such as points (e.g., rewards points), airline miles, products (e.g., a free coffee, free dessert, free fries), discounts (e.g., 20% off one meal), or cash (e.g., $5.00 added to the gift card value). With such an incentive, when the purchaser is deciding which gift card to buy, for example, from one fast-food chain or another fast-food chain, the purchaser might opt for the gift card that comes with the chance of winning something extra.

In some embodiments, the recipient of the gift card finds out if they won anything is determined when the gift card is first used. In some embodiments, the recipient of the gift card scratches off coverings on the gift card to reveal if and what they have won. In some embodiments, the recipient of the gift card scratches off coverings on the gift card to reveal a scannable indicia or scan code (e.g., a QR Code®) which has embedded therein a link to the world-wide web that will be used to find out if the recipient (or purchaser) has won any prize.

As an example of the purchasing decision process, if the purchaser is buying an airline gift card and there are two airlines in contention, but one airline includes an opportunity for a free round-trip flight, an upgrade, or a free drink, the purchaser might be persuaded to buy the gift card with this opportunity over the gift card that lacks this opportunity of a gift.

Although, in some embodiments, no fee or no additional fee is required to obtain the chance of winning for the recipient, in other embodiments, a small fee is required. For example, when purchasing a $50.00 gift card, a $2.00 fee will add the scratch-off option or the first-use option. In some embodiments, the small fee is integrated into the activation fee. For example, instead of the activation fee being $4.95, the activation fee is $5.10.

In one embodiment, a system for enhanced gift cards is disclosed. The system includes one or more enhanced gift cards. Each enhanced gift card in the plurality of enhanced gift cards has a serial number. There are one or more prizes (e.g., monetary prizes, product prizes, discount prizes). Each prize is associated with a single enhanced gift card (e.g., some enhanced gift cards will have a prize, some will not have a prize). After purchase of an enhanced gift card, the system emits an indication of when that enhanced gift card has been associated with one of the plurality of prizes and there is a way for the holder of that enhanced gift card to retrieve the associated prize (e.g., an immediate discount, free items, cash back, merchandise mailed to the card holder).

In another embodiment, a method of enhancing gift cards is disclosed. The method includes providing one or more enhanced gift cards. Each of the enhanced gift cards has a serial number. The method includes providing one or more prizes (e.g., monetary prizes, product prizes, discount prizes) and associating each prize with a single enhanced gift card of the plurality of enhanced gift cards. Then, after purchasing an enhanced gift card, when that enhanced gift card has been associated with one of the plurality of prizes, the prize is disclosed (e.g., during activation of the enhanced gift card, by scratching off coverings to reveal the prize). When that enhanced gift card is used, providing the prize that was associated with that enhanced gift card.

In another embodiment, an enhanced gift card is disclosed including a serial number and a mechanism for disclosing when the enhanced gift card is associated with a prize. After purchase, when the enhanced gift card is used and when the enhanced gift card is associated with the prize, the prize is provided (e.g., to the recipient of the enhanced gift card).

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
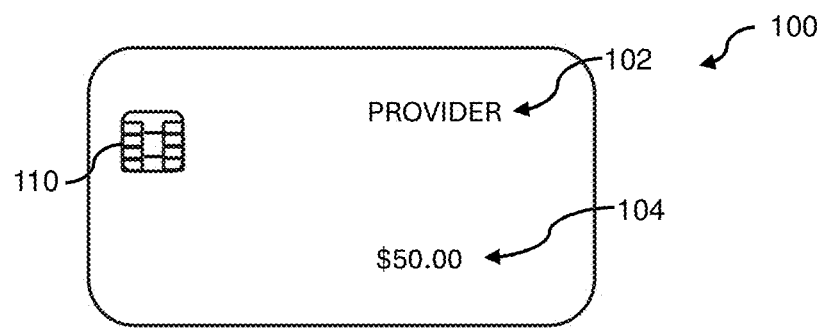
FIG. 1 illustrates a schematic view of a face of a gift card of the prior art.

Reference will now be made in detail to the presently preferred embodiments of the invention, examples of which are illustrated in the accompanying drawings. Throughout the following detailed description, the same reference numerals refer to the same elements in all figures.

Figure 2:
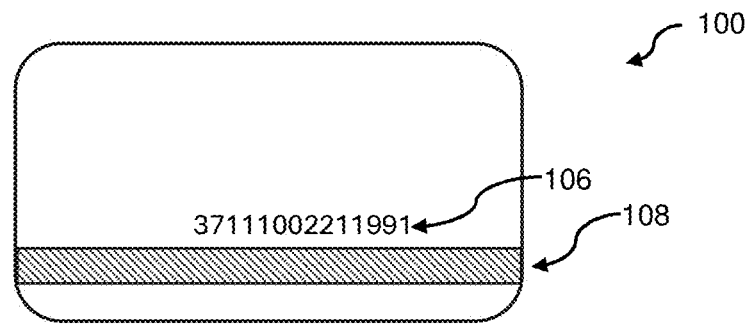
FIG. 2 illustrates a schematic view of a back of a gift card of the prior art.

Referring to FIGS. 1 and 2, schematic views of a gift card 100 of the prior art are shown. This example of a gift card 100 of the prior art includes a provider name 102 informing the holder where they might be able to redeem this gift card 100. In some cases, the provider name 102 is for a specific retailer or set of retailers while in some cases, the provider name 102 is the issuer for a gift card 100 that is of general use and not tied to a specific retailer. The front of the gift card 100 often displays an amount or value 104 of the gift card (e.g., $50.00), especially for gift cards 100 that are for specific retailers. Often, the gift card 100 has an embedded chip 110 for security and identification reasons. In FIG. 2, the back of the gift card 100 of the prior art is shown having some information 106 printed such as the card number of the gift card and instructions. The gift card 100 of the prior art also has a magnetic strip 108 for use in magnetic card readers (not shown) often used at retail point-of-sale registers.

Figure 3:
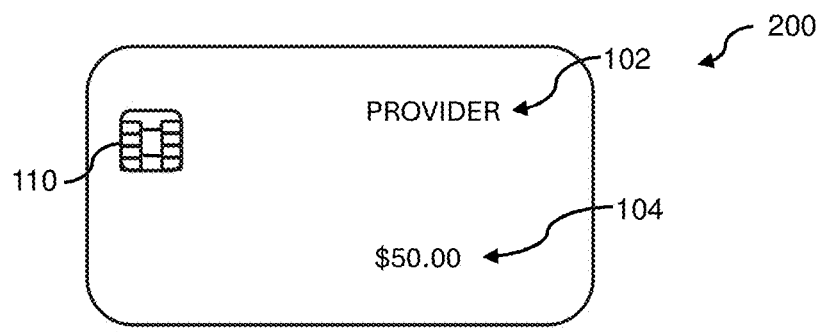
FIG. 3 illustrates a schematic view of a face of an enhanced gift card of the present invention.
Figure 4:
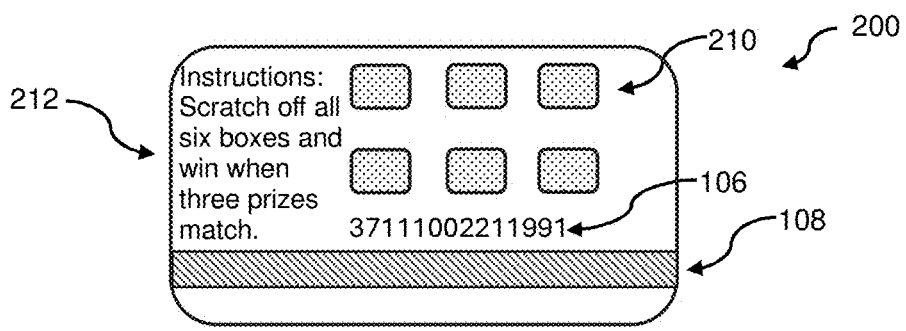
FIG. 4 illustrates a schematic view of a back of an enhanced gift card of the present invention.

Referring to FIGS. 3 and 4, schematic views of an enhanced gift card 200 of the present invention are shown. As with the gift card 100 of the prior art, in many embodiments, the enhanced gift card 200 includes a provider name 102 informing the holder where they might be able to redeem this gift card 100. In some cases, the provider name 102 is for a specific retailer or set of retailers while in some cases, the provider name 102 is the issuer for a gift card 100 that is of general use and not tied to a specific retailer. In many embodiments, the front of the enhanced gift card 200 shows an amount or value 104 of the gift card (e.g., $50.00), especially for enhanced gift card 200 that are for specific retailers. In many embodiments, the enhanced gift card 200 has an embedded chip 110 for security and identification reasons, as known. In FIG. 4, the back of the enhanced gift card 200 is shown having some information 106 printed such as the coded number of the gift card and instructions. In some embodiments, the enhanced gift card 200 has a magnetic strip 108 for use in magnetic card readers (not shown) often used at retail point-of-sale registers.

In FIG. 4 the enhanced gift card 200 includes an opportunity for the recipient or user of the enhanced gift card 200 to win a prize. In this embodiment, the recipient or user of the enhanced gift card 200 has an opportunity to discover if they have won a prize by scratching off coatings over one or more hidden prize spaces 210 that are formed on the back of the enhanced gift card 200. This will reveal the content (e.g., text, numbers, icons, scannable code, QR Code®) that is printed in the hidden prize space(s). The coatings occlude the content beneath the one or more hidden prize spaces 210 until the coatings are scratched off. The technology for fabricating such coatings over the hidden prize spaces 210 is well known in the industry and is often used to conceal activation codes on pre-paid gift cards. In this embodiment, for example, when the recipient or user of the enhanced gift card 200 wants to see if they have won a prize, the recipient or user uses an object (e.g., a coin) to "scratch off" the coating that is formed over each of the one or more hidden prize spaces 210, according to instructions 212 printed on the back of the enhanced gift card 200 or provided with the enhanced gift card 200, etc. Note for embodiments having a hidden QR Code®, only a single hidden prize space 210 is present and, in some such embodiments, the QR Code® is not hidden as it will not be enabled until the enhanced gift card 200 is purchased.

Figure 5:
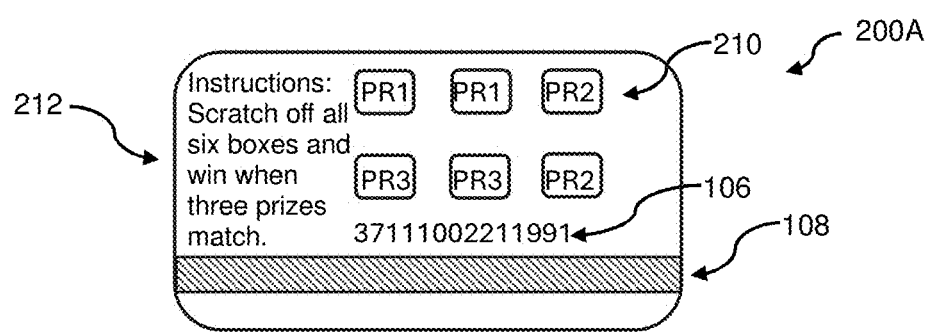
FIG. 5 illustrates a schematic view of a back of an enhanced gift card of the present invention after scratch-off.

FIG. 5 shows the back of an enhanced gift card after this "scratch-off" action was performed. In this example, there are six hidden prize spaces 210 that are now revealed and if three of the hidden prize spaces 210 show the same prize, the recipient or user wins whatever prize shown. For brevity, the hidden prize spaces 210 (now not hidden) show an assortment of prizes, PR1, PR2, and PR3. An example of possible prizes for a fast food retailer is PR1="free fries," PR2="free drink," and PR3="10% discount." An example of possible prizes for an airline gift card is PR1="free headset," PR2="1000 airline miles," and PR3="upgrade to 1$^{st}$ class." An example of possible prizes for an enhanced gift card 200 that is of general use is PR1="1000 points," PR2="logo pen," and PR3="2% added card value." The latter ("2% added card value"), for example, is added money automatically loaded onto the enhanced gift card 200. If the gift card was purchased loaded with a value of $50.00 and the recipient or user reveals this "2% added card value," the actual amount of money that is loaded onto this enhanced gift card 200 is $51.00 ($50.00 plus 2% of $50.00). Note that these are meant as examples of possible prizes and are in no way intended to limit the present invention as countless types and values of prizes are anticipated. Furthermore, the representation of the prizes in the hidden prize spaces 210 and the method of determining a winning prize is not restricted in any way. For example, in some enhanced gift cards 200, words are placed in the hidden prize spaces 210 (e.g., "drink," "fries," "1K miles," "2%") while in some enhanced gift cards 200, icons are placed in the hidden prize spaces 210 (e.g., an icon of a drink, an icon of fries, an icon of a cup of coffee). In some embodiments the determination of a winner is a simple statement that is in the hidden prize spaces 210 such as "congratulations, you have won a free cup of coffee."

In FIG. 5, the now revealed hidden prize spaces 210 show two PR1, two PR2, and two PR3. Therefore, according to the instructions 212 of this embodiment of the enhanced gift card 200A, the enhanced gift card 200A shown in FIG. 5 has not won a prize. Again, note that any type of hidden game is anticipated, and the three-match game is but one example. Other examples include, but are not limited to, a poker-style hidden game, a number game, a word game or a scannable code (e.g., a QR Code®) that links through the world-wide web to a digital game. In some embodiments, there is no actual game, and simply a statement of win or lose or a scannable code (e.g., QR Code®) that provides a link to a web site that indicates win/lose, and if win, the prize that was won.

Figure 6:
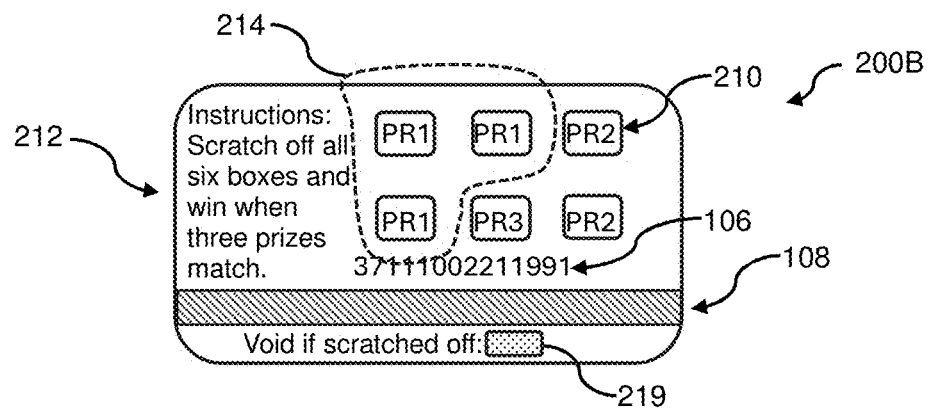
FIG. 6 illustrates a schematic view of a back of another enhanced gift card of the present invention after scratch-off.

In FIG. 6, the now revealed hidden prize spaces 210 show three PR1, two PR2, and one PR3. Therefore, according to the instructions 212 of this embodiment of the enhanced gift card 200B, the enhanced gift card 200B shown in FIG. 6 has won whatever prize PR1 represents as there are three PR1s 214 revealed. For example, if PR1 is an icon of fries, the recipient or user is able to receive a free order of fries when they use this enhanced gift card 200B at the retailer. Note that, in some embodiments, it is fully anticipated that a single use mechanism be provided so that the recipient or user of the enhanced gift card 200 is not able to receive the prize multiple times. For example, a void scratch-off area 219 is included on the back of the enhanced gift card 200B, for example, having the word "void." under the scratch off material so that, after the recipient or user presents the card for redemption of the prize, the clerk is able to scratch off the material over the void scratch-off area 219 to reveal the word "void," making it so that upon subsequent uses of the enhanced gift card 200B, the prize is not maliciously or inadvertently received again. In some embodiments, the distribution of the prize is recorded in a database, associated with the serial number, a scannable code (e.g., a QR Code®) or number of this enhanced gift card 200 to prevent subsequent disbursements of the prize. For example, when the recipient or user provides the enhanced gift card 200B for payment of an order at the retailer's point of sale terminal and the recipient has ordered the item of the prize (e.g., has ordered fries if PR1 is "fries"), then before deducting the price of the fries from the ticket, a database is checked to see if the free fries have already been provided to the recipient or user of this specific enhanced gift card 200B. Once the free fries have been provided, the database is marked to indicate such so that on subsequent uses of this specific gift card 200B, there will be no deduction for the price of the fries. There are many ways to restrict the winning enhanced gift cards 200B to only allow the recipient or user to receive the prize a single time, all of which are fully anticipated and included herein. In some embodiments, it is possible for the recipient or user to receive the prize more than once as long as there remains value on the enhanced gift card 200B. For example, 10% off each time the recipient or user makes use of the enhanced gift card 200B to make a payment.

Figure 7:
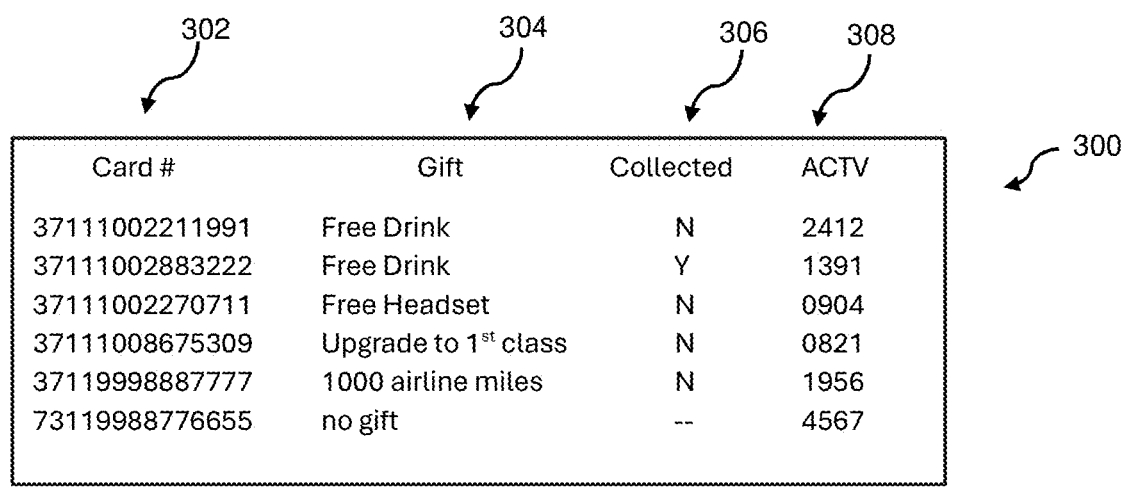
FIG. 7 illustrates a table of pre-programmed winning for enhanced gift cards of the present invention.

Referring to FIG. 7, a table or database 300 of scratch-off or pre-programmed winning for enhanced gift cards 200 of the present invention is shown. This database 300 includes the serial numbers 302 of the enhanced gift card 200, the gift 304 associated with that enhanced gift card 200, and in some embodiments, a field 306 indicating whether the gift 304 of each specific enhanced gift card 200 has been redeemed. For example, the second "free drink" has already been redeemed. In the embodiments above, a database 300 like this is used to track when each gift 304 has been redeemed for each specific enhanced gift card 200. In some embodiments, this database 300 also includes the serial number 302 of all enhanced gift cards 200, including those that have no gift 304 associated with that enhanced gift card 200. In some embodiments, the database 300 is an existing database used in back-end processing of gift cards, and is modified to add the gift 304 field for enhanced gift cards 200.

In some other embodiments, notice of winning the gift 304 is announced when the recipient or user activates the enhanced gift card 200. Activation is known in the industry and typically includes visiting a trusted website and entering the serial number 302 of the enhanced gift card 200 and an activation code 308. In such embodiments, the serial number 302 is verified and checked to make sure the activation code 308 matches as known in the art. If they match, the gift card is activated. In some embodiments of the present invention, upon activation of the enhanced gift card 200, the database 300 is accessed to determine if this specific enhanced gift card 200 has been awarded a prize or gift 304 and, if so, a message is displayed to the recipient or user informing the recipient or user of the enhanced gift card 200 as to the value of the prize or gift 304. Thereafter, when this enhanced gift card 200 is used, the prize or gift 304 is redeemed. For example using the example shown in FIG. 7, when the recipient or user makes a purchase using the enhanced gift card 200 having the card number of 37111002211991 (first entry in the database 300) and the recipient or user purchases a drink, the cost of the drink is set to zero (free drink). In some embodiments, the database is then updated to change the collected field 306 to indicate that the prize has been collected (e.g., 'Y') so that upon subsequent uses of the enhanced gift card 200 having the card number of 37111002211991, no further free drinks are rewarded.

Figure 8:
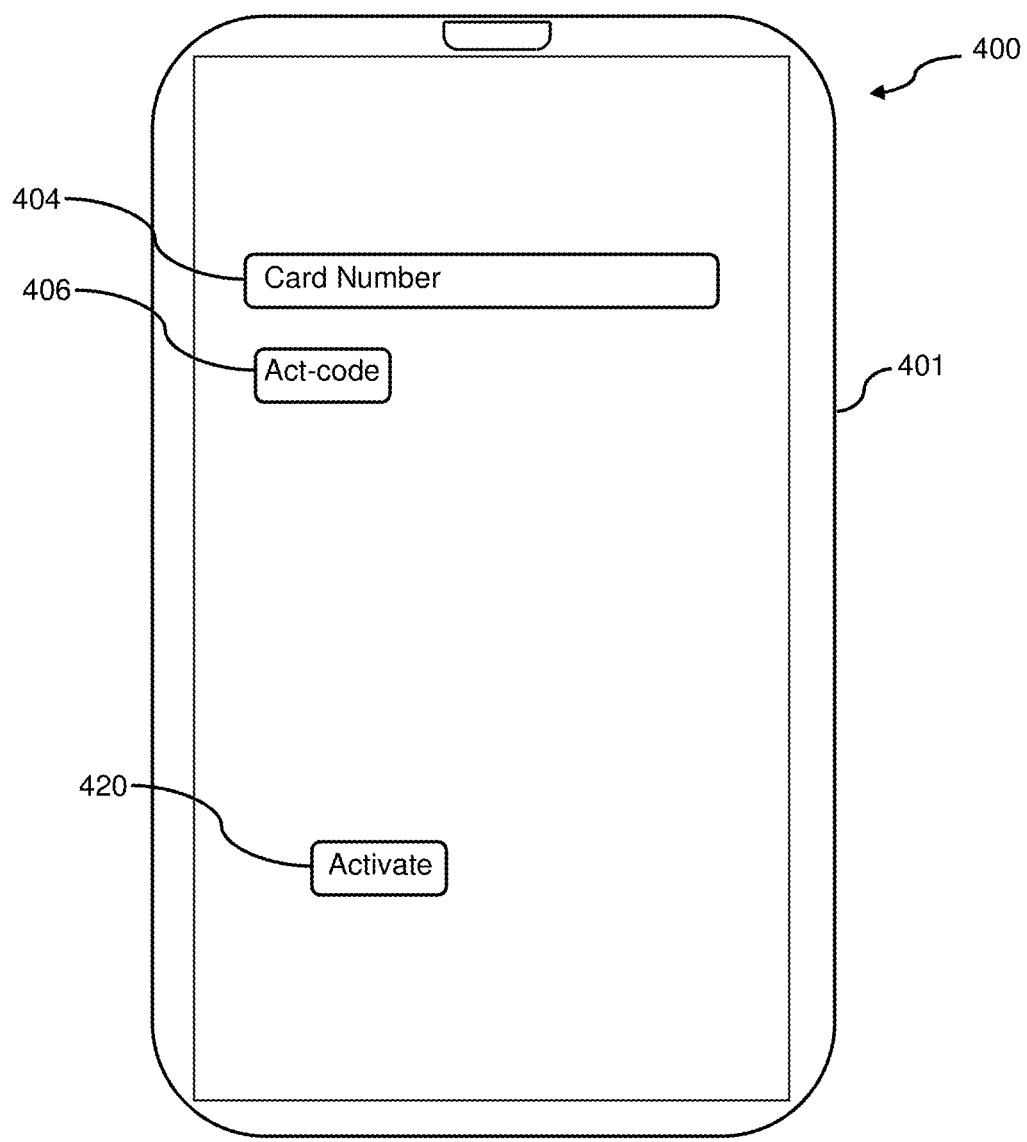
FIG. 8 illustrates an exemplary activation user interface of an enhanced gift card of the present invention.
Figure 9:
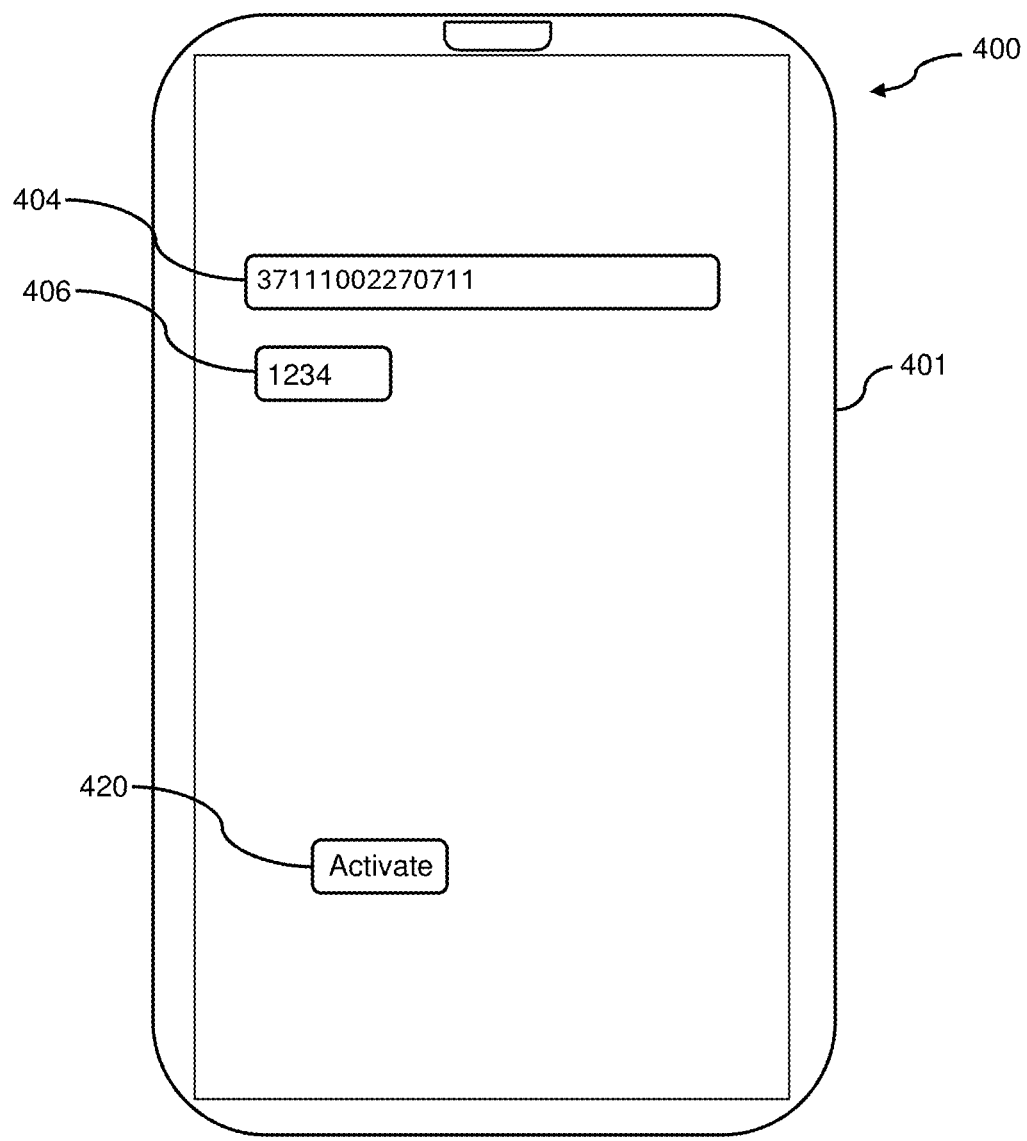
FIG. 9 illustrates a second exemplary activation user interface of an enhanced gift card of the present invention after entering the enhanced gift card information.
Figure 10:
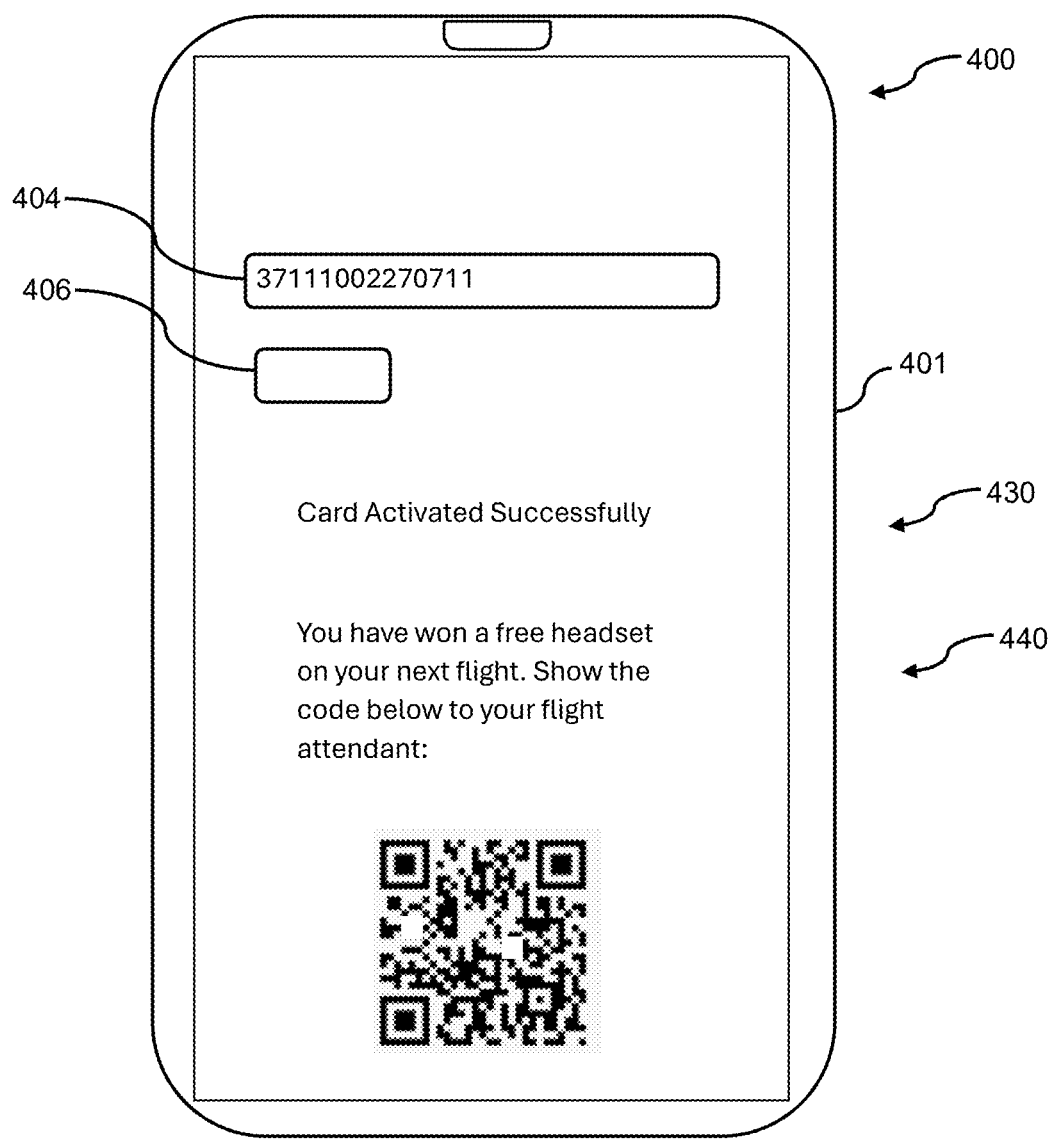
FIG. 10 illustrates a third exemplary activation user interface of an enhanced gift card of the present invention showing activation completion and a prize won by the recipient/activator.

Referring to FIG. 8-10, exemplary activation user interfaces an enhanced gift card 200 of the present invention are shown. In FIG. 8, the recipient or user of the enhanced gift card 200 uses a device 401 to navigate to a web page or opened an application showing the activation user interface 400. In this example, the activation user interface 400 is greatly simplified for brevity and clarity and such information such as identification of the retailer or issuer of the enhanced gift card 200, information telling the user what to do, help screens, etc., is left out. In the activation user interface 400, there is a first entry field 404 for entering the serial number 302 of the enhanced gift card 200 and a second entry field 406 for entering the activation code 308. Additionally, there is an activation feature 420 for initiating the activation.

In FIG. 9, the user has entered the serial number 302 of the enhanced gift card 200 into the first entry field 404 and the activation code 308 into the second entry field 406.

In FIG. 10, the user has invoked the activate feature 420 for initiating the activation (e.g., clicking or double clicking) and the website has responded with a first message 430 indicating that activation was successful. As the card being activated is an enhanced gift card 200, determination has been made whether a prize is to be awarded (e.g., using the database 300) and, if a prize is to be awarded, a message regarding the prize 440 is displayed. In this example, the recipient or user of the enhanced gift card 200 is being awarded a free headset for use on their next flight by providing the attached QR Code® to a flight attendant.

Note that any user interface is anticipated, including, but not limited to, application-based user interfaces (e.g., using a smartphone application or PC application to activate and find out if a prize that is awarded), voice/touchtone user interfaces (e.g., calling a phone number to activate and find out if a prize that is awarded), and in-person user interfaces (e.g., talking to a representative to activate and find out if a prize that is awarded).

Figure 11:
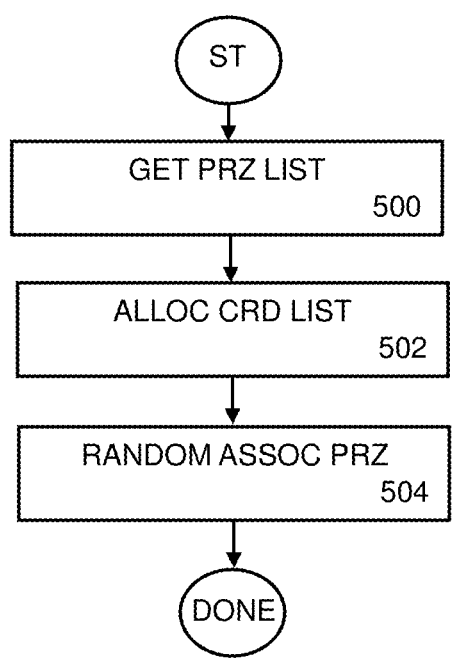
FIGS. 11 and 12 illustrate exemplary program flows for the enhanced gift card of the present invention.
Figure 12:
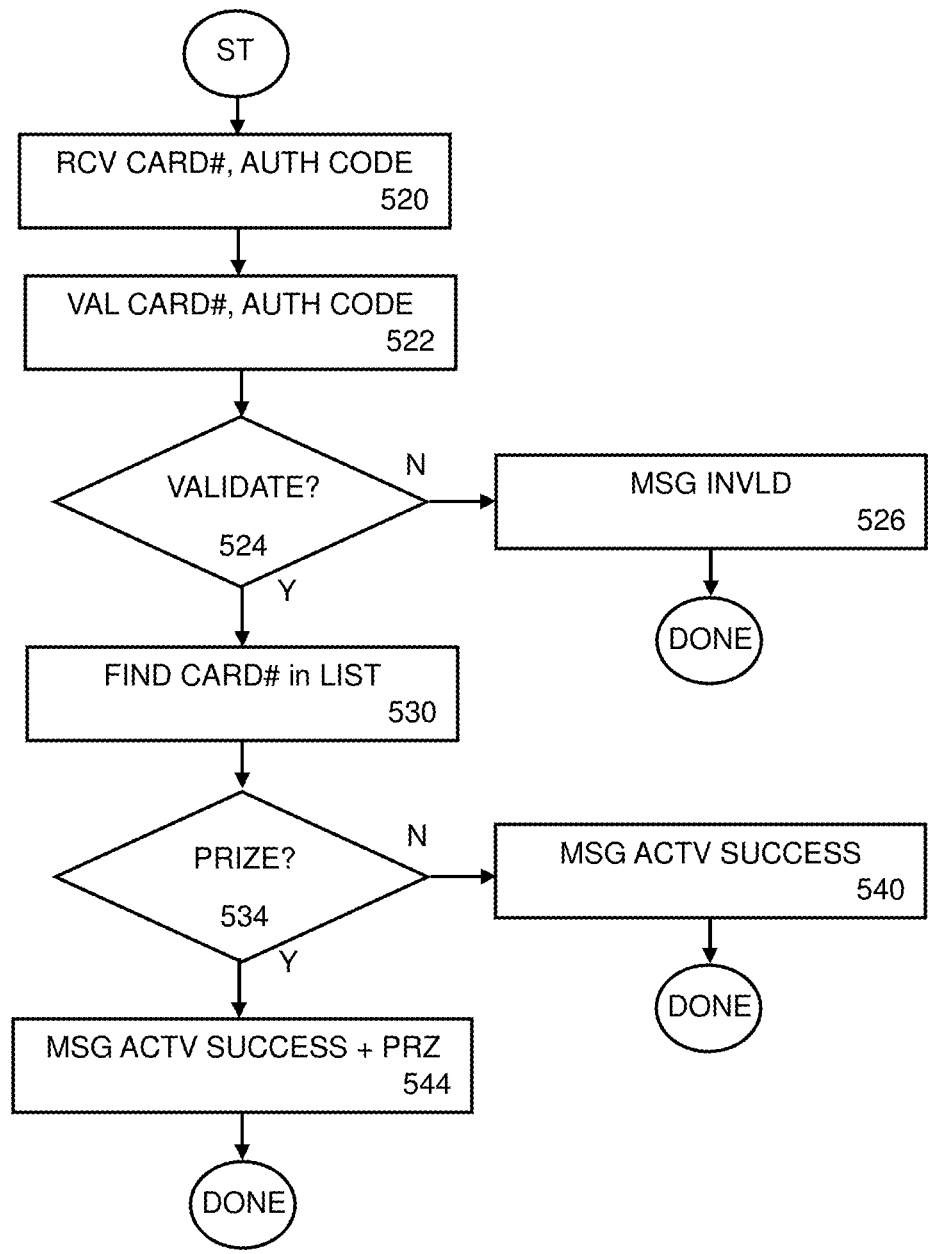

Referring to FIGS. 11 and 12, a typical program flow of an embodiment of the present invention is shown. In FIG. 11 of this embodiment, before any enhanced gift card 200 is distributed/sold, a list of prizes is identified 500 (e.g., 20 free drinks, 25 free fries, 50 10%-off coupons). Now the list of all possible card numbers is allocated 502 and put into a list. Finally, each of the prizes in the list of prizes is associated 504 (or assigned) randomly to one of the card numbers.

In FIG. 12 of this embodiment, one of the cards in the list is being activated. This starts with reception 520 of the serial number and the activation code. As in the prior art, the card number and activation code are validated 522 to make sure that the card is valid. If the card number and activation code does not validate 524, a failure message is emitted 526 (e.g., displayed on the user's device).

If, instead, the card number and activation code does validate 524, then the list of cards is checked 530 to see if this card number was associated with a prize. If the card number is not associated 534 with a prize, since the card activated successfully, a successful activation message is emitted 540.

If the card number is associated 534 with a prize, since the card activated successfully, a successful activation message is emitted along with a description and/or access code for the prize is emitted 544.

Figure 13:
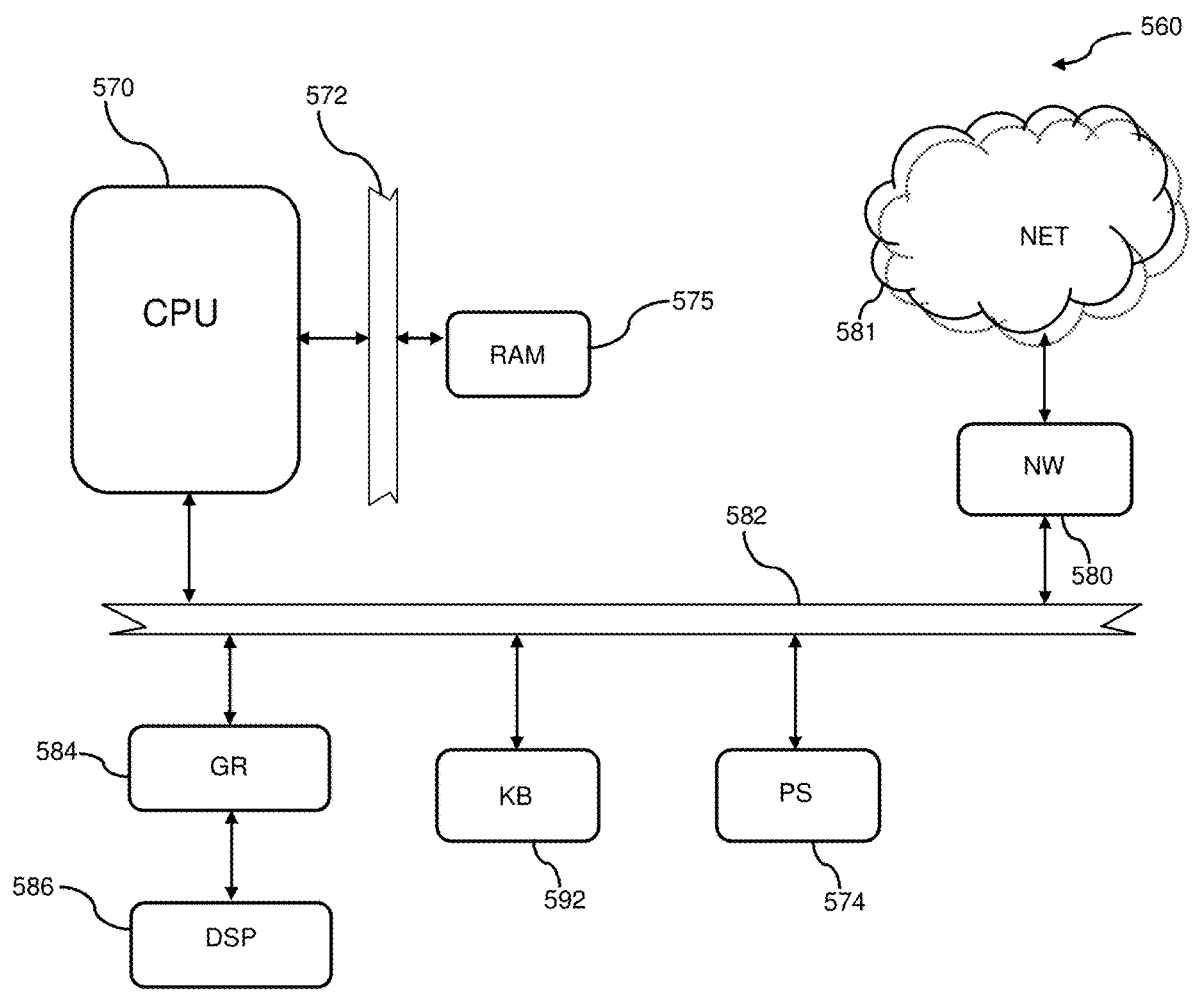
FIG. 13 illustrates a typical computer used by the present invention.

Referring to FIG. 13, a schematic view of a typical computer system is shown. The example computer system 560 represents a typical computer system used for back-end processing, generating reports, displaying data, etc. This exemplary computer system 560 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, rotating magnetic storage, flash memory, read only memory, battery-backed memory, magnetic memory, etc. The persistent memory 574 (e.g., disk storage) is typically interfaced to the processor 570 through a system bus 582, or any other interface as known in the industry.

Also shown connected to the processor 570 through the system bus 582 is a network interface 580 (e.g., for connecting to a data network 581), a graphics adapter 584 and a keyboard interface 592 (e.g., Universal Serial Bus-USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, databases, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A system for enhanced gift cards, the system comprising:
   a computer system of a provider of the enhanced gift cards;
   a plurality of enhanced gift cards, each enhanced gift card in the plurality of enhanced gift cards having a serial number;
   a plurality of prizes, each prize of the plurality of prizes associated with the serial number of a single enhanced gift card of the plurality of enhanced gift cards by the computer system;
   after purchase of one enhanced gift card of the plurality of enhanced gift cards, the computer system emits an indication of when the one enhanced gift card has been associated with one of the plurality of prizes by means for disclosing; and
   means for providing the one of the plurality of prizes.

2. The system of claim 1, whereas the means for disclosing comprises one or more hidden prize spaces on each enhanced gift card, each of the one or more hidden prize spaces having content, the content indicating when each enhanced gift card is associated with one of the plurality of prizes and each of the one or more hidden prize spaces having a coating that occludes the content until the coating is scratched-off.

3. The system of claim 1, whereas the means for disclosing comprises a database operatively coupled to the computer system of the provider that records which of the plurality of prizes is associated with which of the plurality of enhanced gift cards.

4. The system of claim 3, wherein when a particular enhanced gift card is activated, the database is consulted to determine when any one of the plurality of prizes is associated with the particular enhanced gift card.

5. The system of claim 4, wherein after the database is consulted to determine when any one of the plurality of prizes is associated with the particular enhanced gift card, a message is emitted to inform when any one of the plurality of prizes is associated with the particular enhanced gift card.

6. The system of claim 1, wherein a cost of each enhanced gift card in the plurality of enhanced gift cards is fixed at a face value of that enhanced gift card.

7. The system of claim 1, wherein a cost of each enhanced gift card in the plurality of enhanced gift cards is fixed at a face value of that enhanced gift card plus a fee.

8. The system of claim 1, wherein the means for providing one of the plurality of prizes comprises deducting a price of one of the plurality of prizes from a bill being paid for by the each enhanced gift card.

9. A method of enhancing gift cards, the method comprising:
providing a plurality of enhanced gift cards, each enhanced gift card in the plurality of enhanced gift cards having a serial number;
providing a plurality of prizes;
associating each prize of the plurality of prizes with a single enhanced gift card of the plurality of enhanced gift cards;
after purchasing one enhanced gift card of the plurality of enhanced gift cards, disclosing when the single enhanced gift card has been associated with one of the plurality of prizes; and
when the one enhanced gift card is used, providing one of the plurality of prizes.

10. The method of claim 9, whereas disclosing comprises scratching off a coating to reveal one or more hidden prize spaces on the single enhanced gift card, each of the one or more hidden prize spaces having content, the content indicating when the single enhanced gift card is associated with one of the plurality of prizes.

11. The method of claim 9, whereas when associating each prize of the plurality of prizes with the single enhanced gift card of the plurality of enhanced gift cards, recording in a database which of the plurality of prizes is associated with which of the plurality of enhanced gift cards.

12. The method of claim 11, wherein when activating the single enhanced gift card, consulting the database to determine when any one of the plurality of prizes is associated with the single enhanced gift card.

13. The method of claim 12, wherein after consulting the database to determine when any one of the plurality of prizes is associated with the single enhanced gift card, emitting a message to inform when any one of the plurality of prizes is associated with the single enhanced gift card.

\* \* \* \* \*